Nov. 2, 1965   A. W. LORD, JR., ETAL   3,215,966
LAMINATED INDUCTOR CORE ELEMENT HAVING FUSED METAL
BONDS ACROSS ITS EDGES AND METHOD OF MAKING SAME
Filed Aug. 20, 1962
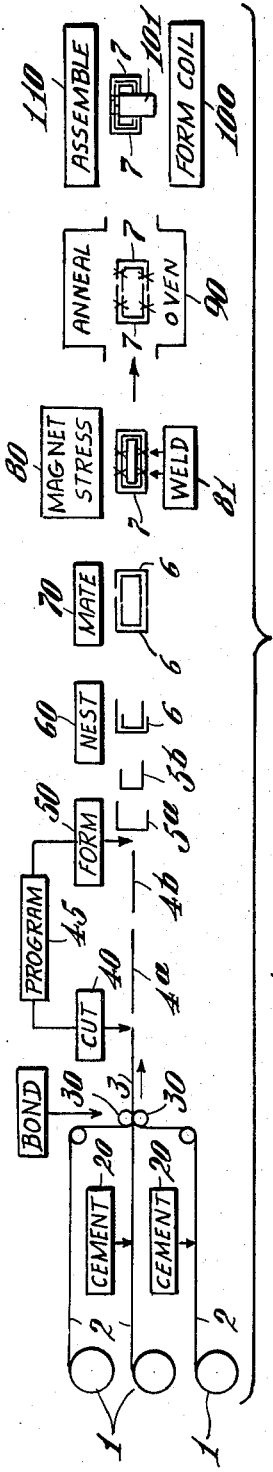
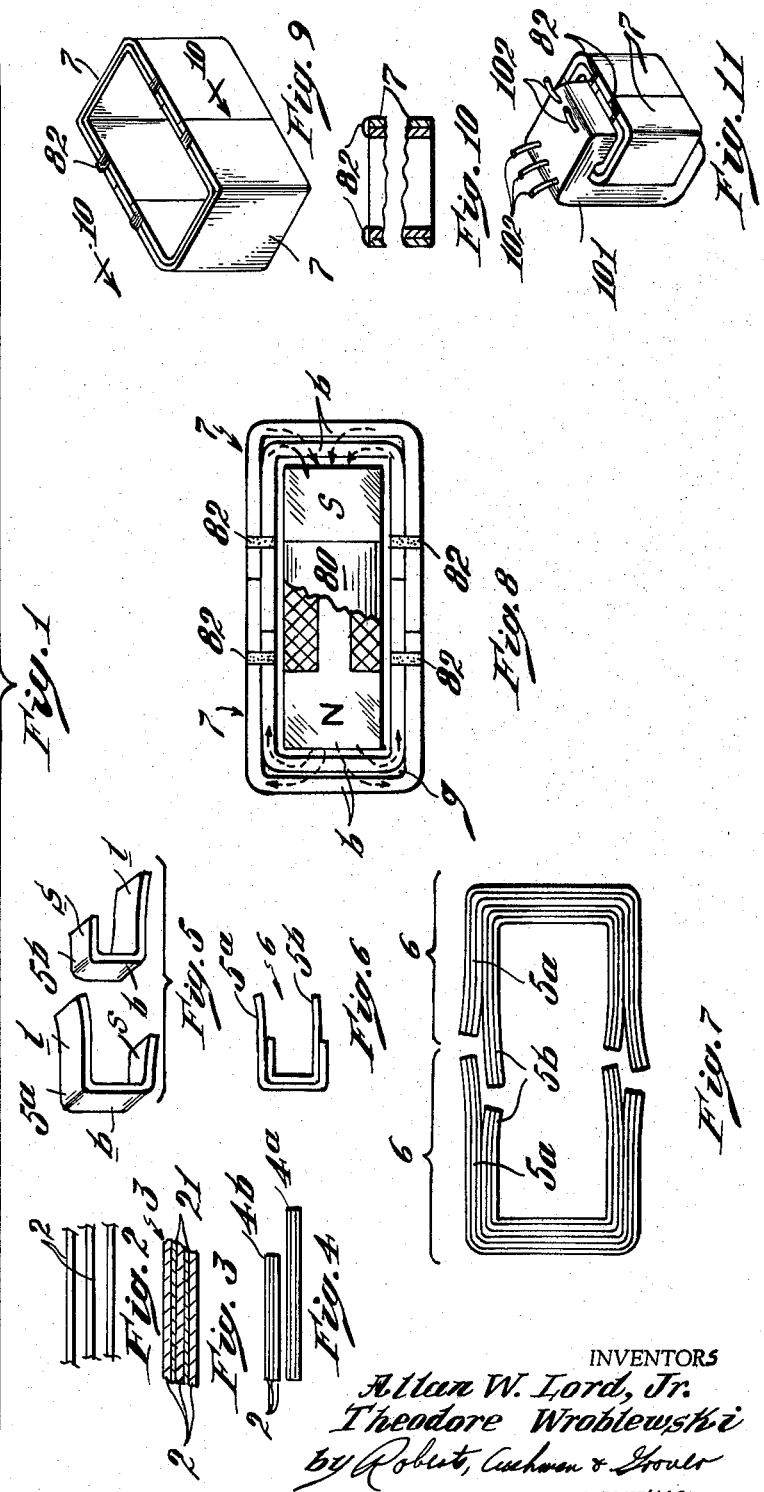
INVENTORS
Allan W. Lord, Jr.
Theodore Wroblewski
by Roberts, Cushman & Grover
ATT'YS

United States Patent Office 3,215,966
Patented Nov. 2, 1965

3,215,966
LAMINATED INDUCTOR CORE ELEMENT HAVING FUSED METAL BONDS ACROSS ITS EDGES AND METHOD OF MAKING SAME
Allan W. Lord, Jr., and Theodore Wroblewski, Danvers, Mass., assignors to Sylvania Electric Products Inc., Wilmington, Del., a corporation of Delaware
Filed Aug. 20, 1962, Ser. No. 217,958
19 Claims. (Cl. 336—211)

This invention is related to improved electromagnetic inductors, such as transformers or reactors, and to new methods for manufacturing such inductors and particularly laminated cores for such inductors.

Electromagnetic inductors, of which transformers and reactors are examples, usually comprise a ferromagnetic core forming a closed magnetic flux path and one or more current carrying coils around the path for producing flux in the core path. Since the flux tends to produce eddy currents in the core which reduce the efficiency of the inductor, most inductor cores are laminated rather than solid. In practical, economic manufacture an inductor core is formed of two or more core elements each comprising a group of magnetic metal strips formed, in a C shape for example, and nested face to face. After one or more coils are assembled on a core element its ends are joined with the ends of at least one other core element so as to form a magnetic flux path extending through the joined ends. Thereafter the core elements and coil are secured together in a permanent inductor assembly. To facilitate assembly of the core elements and to reduce flux loss at their joined ends preferably the individual strips of each element are staggered in length so that the ends of one core element interleave with the staggered ends of another element forming a joint in which the respective ends are in overlapping, face to face engagement as well as in butting, end to end engagement. The fact that each strip end both butts an opposed end and overlaps a laterally adjacent end is significant with respect to magnetic energy loss at the joints in operation of the core. To minimize air gap width, and hence energy loss, it is desirable not only that the butt joints be tight, but also that the overlapping ends of two core elements be close face to face. Thereby flux leaking at a butt joint immediately enters adjacent overlapping ends with minimal energy loss.

Despite the high desirability of the lap and butt joint it has proved difficult after several years of manufacturing experience to insure that the face to face, overlapping engagement and the end to end butt engagement of the strips is snug at the ends of all strips. It is economically not feasible to cut the strips of each group so exactly to length that their ends mate the ends of another interleaved group without irregular air gaps between some overlapping and some butt joints. Unavoidable variations in stock thickness prevent presetting the forming machine with such accuracy. Also the strip ends may splay away from one another owing to unavoidable variations in forming the strips in C or other bent shape. The strips may also become distorted in the process of annealing the core and in operation under magnetic and thermal stresses. These distortions are particularly troublesome when very thin sheet metal stock is used to form the strips. For example, despite the desirable reduction in eddy current loss it has been found quite impractical to attempt to form sheet metal stock less than 0.014 inch in thickness.

It has been proposed to align the strips in each nested group or core element by passing a rod through holes punched in the strips. However, punched sheet metal stock is deficient both electrically and magnetically for use in inductor cores, and the use of such stock would sacrifice any grain achieved in operating efficiency. Whether punched before or after the strips were cut and formed, the holes would not give any greater assurance of snug engagement than allowed by the necessary manufacturing tolerances which create the problem.

One object of the present invention, therefore, is to provide a core construction which insures optimum snugness of the lap and butt joint in a multistrip core and which so minimizes energy loss in the air gaps at the joints as to permit reduction of core size without loss of efficiency.

Another object is to provide an inductor core in which the individual laminated strips are thinner than those hitherto used to reduce eddy current loss, which nevertheless is as easily and economically manufactured as a less efficient core using thicker strips. More specifically the invention permits the use of non-metallically (e.g. organically) bonded strip stock wherein the individual strips are well below the previous minimum thickness of 0.014 inch.

A further object is to provide an improved and more economical way of manufacturing inductor cores.

According to the invention an inductor core element comprises a nested group of magnetic metal strips of different lengths, said strips being disposed face to face with their edges flush and their ends staggered for overlapping and butt engagement with the ends of a similar nested group of strips, said nested strips having fused metal bonds in zones extending across the edges of the strips adjacent the strip ends at one side only of the strips. Preferably the strips are held by said bonds in intimate face to face engagement adjacent the strip ends and in loose face to face relation intermediate the bonds, whereby environmentally caused stresses in the strips between said bonds are prevented from distorting the jointed ends or the shape of said nest. In one form each of the aforesaid strips comprises a plurality of thinner laminations bonded together at their faces with an insulating cement.

Further according to the invention a method of making an inductor core element comprises forming a nested group of magnetic metal strips of different lengths face to face with their edges flush and the strip ends staggered for overlapping and butt engagement with the ends of a similar nested group of strips, joining the ends of two or more of said nested groups in said overlapping and butt engagement so as to form a magnetic flux path extending through said jointed ends, applying a magnetic field with flux lines extending along said flux path through said jointed ends, thereby to draw the ends tightly together endwise and face to face, while applying the magnetic field metallically bonding the strips of each nested group together in zones extending across the edges of the strips adjacent the strip ends and at one side only of the strips. This method may be advantageously employed in conjunction with strip stock made by feeding a plurality of thin magnetic metal sheets together face to face and cementing the sheets face to face to make strip stock. As will be explained more fully, the completed core element is subsequently annealed at a temperature which destroys or severely deteriorates the organic cement holding the stock lamination together during forming. But the metallic bond, made at higher than the annealing temperature, then holds the core strips in proper position.

Other objects and aspects of the invention will be apparent from the following description of illustrative examples of the invention shown in the accompanying drawing in which:

FIG. 1 is a functional diagram showing the steps of making an inductor from magnetic metal sheets;
FIG. 2 is a side view of three sheets of magnetic metal;
FIG. 3 is a side section of a three sheet laminated strip;

FIG. 4 is a side view of a group of two laminated strips of different lengths;

FIG. 5 is a side view of a group of two shaped strips;

FIG. 6 is a side view of a group of two shaped strips nested;

FIG. 7 is a side view of two mated groups of shaped strips;

FIG. 8 is a side view showing two mated groups of shaped strips around a magnet;

FIG. 9 shows a completed inductor core;

FIG. 10 is a section on line 10—10 of FIG. 9; and

FIG. 11 shows a completed inductor.

FIGS. 1 to 10 show the steps in making a laminated core transformer which, as shown in FIG. 11 comprises a preformed coil 101 having two or more windings terminating in leads 102, and a core formed of two interfitted mating elements 7.

The core elements may be manufactured from magnetic metal sheet stock such as ASTM grade M6 steel from 0.001 to 0.014 inch thick. As shown at the left of FIG. 1 three sheets of stock 2 are supplied from rolls 1 and fed along a path to bonding rollers 30. Between the supply rolls and bonding rollers a non-metallic or insulative cement coating 21 is applied to two of the sheets 2. The rollers 30 then press the three sheets together face to face and bond them into laminated strip stock 3 shown in section in FIG. 3. The strip stock is then divided longitudinally into narrow stock which is fed to cutting and forming stations such as are disclosed in the copending application of Orrick Biggs, Theodore Wroblewski and David R. Dayton, Serial No. 764,588.

Alternatively a single nonlaminated strip of stock such as ASTM grade M19 steel 0.024 inch thick may be fed to the cutting and forming stations, the operations at these and subsequent stations being the same for either form of stock.

The cutting station 40 and forming station 50 are controlled by a programmer 45. Under this control the cutting station severs progressively different lengths of strip from the stock 3. For clarity of illustration two such lengths 4a and 4b are shown in FIG. 4, but it will be understood that in practice several different lengths are cut.

At the forming station 50 the different lengths of strip are formed, for example, into a group of C-shaped pieces each of which has a long arm $l$, a short arm $s$ and a base $b$. The dimensions of the arms $l$ and $s$ and the base $b$ are increased in increments dependent on the thickness of the stock such that each successive U-shaped piece in a group nests within the previously formed piece with the long and short sides staggered so that alternate ends of the pieces overlap as shown in FIG. 6. The staggered ends of each nested group 6 of lengths 5a and 5b are cut and formed to interleave with the ends of a like nested group 6 as shown in FIG. 7.

Two nested groups 6 roughly comprise one half of an inductor core. But as shown in FIG. 7 even with carefully designed cutting and forming machines the ends of the C-shaped pieces are more or less distorted. When, as contemplated, nine or more C-shaped pieces are nested it is difficult to bring the core halves together. And even if they can be brought together the overlapping ends of the pieces do not meet in good face to face and end to end butt engagement.

According to one aspect of the invention, after loosely nesting a group 6 of C-shaped pieces at a station 60 and then mating two such nested groups 6, the mated groups are held in a jig in a magnetic field. As shown in FIG. 8, the magnetic field is applied by an electromagnet 80 having north and south poles N and S opposite the bases $b$ of the C-shaped pieces. A direct current through the coil of the electromagnet produces a uni-directional magnetic field whose flux lines (shown as broken line arrows in FIG. 8) extend primarily from one pole to the opposed bases $b$, through both arms of the pieces, thence through the joined ends of the pieces and the opposite bases to the other pole. With a nine strip core 2.5 x 0.75 x 1.25 inches, the ends of the arm pieces will be drawn by a magnetic field of one kilogauss into close face to face engagement, and the individual pieces will be drawn lengthwise of the arms and stressed until the ends of the pieces come together in tight butting engagement as well as tight overlapping face to face engagement.

While the magnetic field so holds the pair of nested pieces a metal bond 82 is applied to the pieces by welding, brazing or hand soldering apparatus 81 preferably at a temperature in excess of 1500° C. The bond is applied to two zones of each group. These zones are located at the edges of the strips immediately adjacent their ends and at one side of the faces only as shown in FIGS. 8 to 10. By locating the bonding zone adjacent the strip ends, the ends are permanently secured in a position which insures the desired tight butting and overlapping engagement. Bonding around the nested laminated strips and provide a hinge zones applied at only one side avoid shortcircuiting eddy currents as described below.

When so bonded the nested groups form a half core or inductor element which is in intimate face to face engagement adjacent the bonds but in relatively loose face to face engagement intermediate the bonds particularly at their bases $b$ and at the corners adjacent the bases. As shown in FIG. 8 thin air gaps $g$ are visible. These air gaps do not allow undesirable flux loss since there is negligible tendency for flux to leak from the continuous ferromagnetic paths provided by the strips. The very slight air gaps do allow compensation for thermal and magnetic stresses experienced by the core during annealing or in operation. This compensation tends to avoid distortion of the joined ends owing to the asymmetric location of the bonding zones 82. The pieces are also yieldingly urged toward butting engagement by virtue of a stress applied by the metallic bond. The bond tends to act as a flexible hinge which will resiliently hold the strip ends in tight butting engagement with a mating group.

After the core halves 7 have been bonded, and while in engagement they are annealed in an oven 90 at 1200° to 1500° F. for approximately one half hour. Hitherto, care in the cutting and forming steps was partially wasted owing to warping caused during the annealing. But by annealing after the bonding step such distortion is substantially eliminated.

The most important benefit derived from the cementing, forming, bonding and annealing sequence is that it makes possible the use of stock comprising multiple extremely thin laminations, as thin as 0.001 inch, bonded with organic cements such as epoxy and lacquer. Such cements need be only strong enough to hold the laminations together during the forming operations and up to and including the metal bonding step prior to annealing. The cement need not be relied on to withstand the annealing treatment and in fact may be substantially burned off, leaving a residue, because the metal bond will withstand the annealing temperature and hold the laminations together as well as the formed pieces which comprise the core halves.

Preferably the pair of mated inductor elements core halves which has been bonded and welded together are kept together. Such mated inductor elements are complete units which may be supplied to inductor manufacturers. For example, in manufacturing a transformer a coil 101 having a rectangular opening in its center is preformed by a series of known operations 100. The inductor assembly is then completed by passing one arm of each inductor element into the coil opening until the elements engage both in the opening and outside the coil, as shown in FIG. 11. The coil and core are then secured together by attaching any one of several conventional end bells or housings to the coil and core assembly.

Transformers and other inductors made with the new core elements show several advances in performance. The laminations are mechanically quieter in operation and thus dissipate less energy acoustically. The annealed grain structure made possible by the bonds results in an improved hysteresis characteristic and reduced eddy current loss. There is also a reduction in energy loss in the gaps between two interengaged core elements. A core made according to this invention has been found to have a net energy loss of 1.6 watts per pound in comparison with 1.8 watts per pound found in the best comparable core made by the same manufacturer of the same steel stock. In the present state of the art this is a significant advance and will permit manufacture of more compact transformers without loss of capacity.

Additional advances in efficiency are made possible by the use of extremely thin laminations, between 0.001 and 0.0014, which were neither feasible to use nor capable of being annealed prior to this invention.

These advances in performance are accompanied by economy in manufacture and ease of assembly. The metal bond not only facilitates handling of the core elements, but also its hinge-like structure may be used to insure tighter interengagement. In the C-shaped element shown, bonds on the two parallel arms lie in codirectional zones and have a common axis about which the nested strips are urged toward tight butting engagement by stress created in the bonds by the magnetic field applied during bonding.

It should be understood that the foregoing disclosure is for the purpose of illustration only and that the present invention includes all modifications which fall within the appended claims.

We claim:

1. An inductor core element comprising a nested group of magnetic metal strips of different lengths, said strips being disposed face to face with their edges flush and their two open ends staggered for overlapping and butt engagement with the two ends of a similar nested group of strips, said nested strips having fused metal bonds in zones extending across the edges of the strips adjacent each of the strip two ends at one side only of the strips.

2. An inductor core element comprising a nested group of magnetic metal strips of different lengths, said strips being disposed face to face with their two open edges flush and their ends staggered for overlapping and butt engagement with the two ends of a similar nested group of strips, said nested strips having fused metal bonds in zones extending across the edges of the strips adjacent the strip ends at one side only of the strips, the strips being held by said bonds in intimate face to face engagement adjacent each of the strip two ends and in loose face to face relation intermediate the bonds.

3. An inductor core element comprising a nested group of magnetic metal strips of different lengths, said strips being disposed face to face with their two open edges flush and their ends staggered for overlapping and butt engagement with the two ends of a similar nested group of strips, said nested strips having fused metal bonds in zones extending across the edges of the strips adjacent each of the strip two ends at one side only of the strips, each said bond forming a resilient hinge stressed so as yieldingly to urge the strips in the direction of their ends.

4. An inductor core element comprising a nested group of magnetic metal strips of different lengths, said strips being disposed face to face with their two open edges flush and their ends staggered for overlapping and butt engagement with the two ends of a similar nested group of strips, said nested strips having fused metal bonds in zones extending across the edges of the strips adjacent each of the strip two ends at one side only of the strips, each strip comprising a plurality of thinner laminations having an insulative coating between their faces.

5. An inductor core element according to claim 4 wherein said coating is an organic cement residue.

6. An inductor core element according to claim 4 wherein said laminations are between 0.001 and 0.0014 inch thick.

7. An inductor core element comprising a nested group of magnetic metal strips of different lengths, said strips being disposed face to face with their two open edges flush and their ends staggered for overlapping and butt engagement with the two ends of a similar nested group of strips, said nested strips having fused metal bonds in zones extending across the edges of the strips adjacent each of the strip two ends at one side only of the strips, each strip having an annealed grain structure.

8. An inductor according to claim 7 wherein said bond is formed by metal having a fusing temperature higher than the annealing temperature of the strips.

9. An inductor core element comprising a nested group of magnetic metal strips of different lengths, said strips being disposed face to face with their edges flush and their two open ends staggered for overlapping and butt engagement with the two ends of a similar nested group of strips, said nested strips having fused metal bonds in zones extending across the edges of the strips adjacent the strip ends at one side only of the strips, said strips being formed in generally rectangular C-shape with two parallel arms, and two bonds are formed adjacent each of the two ends of the respective arms in codirectional zones.

10. The inductor core element according to claim 9 wherein both said bonds form resilient hinges having a common axis.

11. The method of making an inductor core element which comprises forming a nested group of magnetic metal strips of different lengths face to face with their edges flush and the strip ends staggered for overlapping and butt engagement with the ends of a similar nested group of strips, joining the ends of two or more of said nested groups in said overlapping and butt engagement so as to form a magnetic flux path extending through said joined ends, applying a unidirectional magnetic field with flux lines extending along said flux path through said joined ends, thereby to draw the ends tightly together endwise and face to face, while applying the magnetic field, bonding the strips of each nested group together in zones extending across the edges of the strips adjacent the strip ends and at one side only of the strips, and thereafter annealing the bonded groups.

12. The method of making an inductor core element which comprises forming a nested group of magnetic metal strips of different lengths face to face with their edges flush and the strip ends staggered for overlapping and butt engagement with the ends of a similar nested group of strips, joining the ends of two or more of said nested groups in said overlapping and butt engagement so as to form a magnetic flux path extending through said joined ends, applying a unidirectional magnetic field with flux lines extending along said flux path through said joined ends, thereby to draw the ends tightly together endwise and face to face, while applying the magnetic field, bonding the strips of each nested group together in zones extending across the edges of the strips adjacent the strip ends and at one side only of the strips, and thereafter annealing the bonded groups, said bonds being formed at a temperature higher than the temperature of annealing.

13. The method of making an inductor core element which comprises forming a nested group of magnetic metal strips of different lengths face to face with their edges flush and the strip ends staggered for overlapping and butt engagement with the ends of a similar nested group of strips, joining the ends of two or more of said nested groups in said overlapping and butt engagement so as to form a magnetic flux path extending through said joined ends, applying a unidirectional magnetic field with flux lines extending along said flux path through said joined ends, thereby to draw the ends tightly together endwise and face to face, while applying the magnetic field, bonding the strips of each nested group together in zones extending across the edges of the strips adjacent the strip ends and at one side only of the strip, and thereafter annealing the bonded groups, said bond being formed by welding said zones of the strips.

14. The method of making an inductor core element which comprises feeding a plurality of thin magnetic metal sheets together face to face, bonding the sheets face to face to form laminated strip stock, cutting groups of different lengths from the stock, bending each length of a group into a shape to nest with other lengths in the group, the ends of the nested lengths being staggered for overlapping and butt engagement with ends of a similar group of nested lengths, joining the ends of two or more nested groups in said overlapping and butt engagement so as to form a closed loop, applying a magnetic field inside and transversely of said loop so as to establish a magnetic flux through said engaged ends thereby to draw the ends tightly together endwise and face to face, while applying the magnetic field bonding the lengths of each group together in zones extending across the edges of the lengths adjacent the ends of the length and at one side only of the face of the lengths, and thereafter annealing the bonded groups.

15. The method of making an inductor core element which comprises feeding a plurality of thin magnetic metal sheets less than 0.0014 inch in thickness togeher face to face, bonding the sheets face to face to form laminated strip stock, cutting groups of different lengths from the stock, bending each length of a group into a shape to nest with other lengths in the group, the ends of the nested lengths being staggered for overlapping and butt engagement with ends of a similar group of nested lengths, joining the ends of two or more nested groups in said overlapping and butt engagement so as to form a closed loop, applying a magnetic field inside and transversely of said loop so as to establish a magnetic flux through said engaged ends thereby to draw the ends tightly together endwise and face to face, while applying the magnetic field bonding the lengths of each group together in zones extending across the edges of the lengths adjacent the ends of the length and at one side only of the faces of the lengths, and thereafter annealing the bonded groups.

16. The method of making an inductor core element which comprises feeding a plurality of thin magnetic metal sheets together face to face, bonding the sheets face to face with a non-metallic, insulating cement to form laminated strip stock, cutting groups of different lengths from the stock, bending each length of a group into a shape to nest with other lengths in the group, the ends of the nested lengths being staggered for overlapping and butt engagement with ends of a similar group of nested lengths, joining the ends of two or more nested groups in said overlapping and butt engagement so as to form a closed loop, applying a magnetic field inside and transversely of said loop so as to establish a magnetic flux through said engaged ends thereby to draw the ends tightly together endwise and face to face, while applying the magnetic field bonding the lengths of each group together in zones extending across the edges of the lengths adjacent the ends of the length and at one side only of the faces of the lengths, and thereafter annealing the bonded groups.

17. The method of making an inductor core element which comprises forming a nested group of magnetic metal strips of different lengths face to face with their edges flush and the strip ends staggered for overlapping and butt engagement with the ends of a similar group of strips, joining the ends of two or more of said groups in said overlapping and butt engagement, urging the ends of respective individual strips into tight endwise and face to face engagement at said ends and opening air spaces between the faces of the strips at locations intermediate their ends, and bonding the strips of at least one nested group in zones extending across the edges of the strips adjacent the strip ends and at one side only of the strips.

18. The method of making an inductor core element which comprises forming a nested group of magnetic metal strips of different lengths face to face with their edges flush and the strip ends staggered for overlapping and butt engagement with the ends of a similar group of strips, joining the ends of two or more of said groups in said overlapping and butt engagement, urging the ends of respective individual strips into tight endwise and face to face engagement at said ends and opening air spaces between the faces of the strips at locations intermediate their ends, bonding the strips of at least one nested group in zones extending across the edges of the strips adjacent the strip ends and at one side only of the strips, and thereafter annealing the bonded groups.

19. The method of making an inductor core element which comprises feeding a plurality of thin magnetic metal sheets together face to face, bonding the sheets face to face with a non-metallic, insulating cement to form laminated strip stock, cutting groups of different lengths from the stock, bending each length of a group into a shape to nest with other lengths in the group, the ends of the nested lengths being staggered for overlapping and butt engagement with ends of a similar group of nested lengths, joining the ends of two or more nested groups in said overlapped and butt engagement, urging the ends of respective individual strips tightly together endwise and face to face and opening air spaces between the faces of the strips at locations intermediate their ends, while so urging the strips bonding the lengths at least of one nested group together in zones extending across the edges of the lengths adjacent the ends of the length and at one side only of the faces of the lengths, and thereafter annealing the bonded groups.

References Cited by the Examiner

UNITED STATES PATENTS

| | | | |
|---|---|---|---|
| 2,523,071 | 9/50 | Somerville | 336—212 |
| 2,561,250 | 7/51 | Treanor | 336—212 |
| 2,586,320 | 2/52 | Ford | 29—155.58 |
| 2,702,935 | 3/55 | Kyle | 336—218 X |
| 2,830,277 | 4/58 | Kane | 336—234 X |
| 2,960,756 | 11/60 | Treanor | 336—211 X |
| 3,010,185 | 11/61 | Hume | 29—155.58 |
| 3,066,388 | 12/62 | Cooper | 336—217 X |

JOHN F. BURNS, *Primary Examiner.*

LARAMIE E. ASKIN, *Examiner.*